Figure 1:
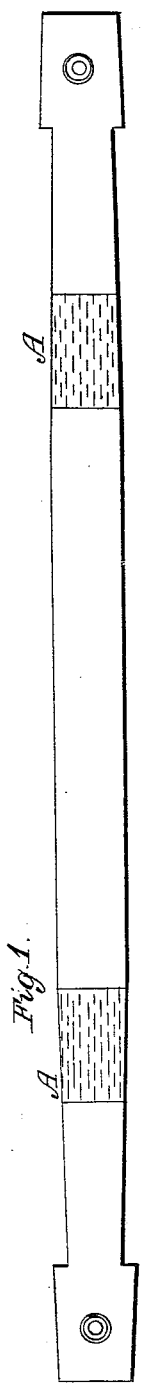

J. W. WEBB.
Cotton Gin Rib.

No. 16,699.

Patented Feb. 24, 1857.

UNITED STATES PATENT OFFICE.

JOHN W. WEBB, OF COTTON VALLEY, ALABAMA.

IMPROVEMENT IN MANUFACTURING RIBS FOR COTTON-GINS.

Specification forming part of Letters Patent No. 16,699, dated February 24, 1857.

*To all whom it may concern:*

Be it known that I, JOHN W. WEBB, of Cotton Valley, in the county of Macon and State of Alabama, have invented certain new and useful Improvements in Manufacturing the Ribs of Cotton-Gins; and I do hereby declare that the same are described and represented in the following specification and drawings.

To enable others skilled in the art to make and use my improvements, I will proceed to describe their construction and use, referring to the drawings, in which the same letters indicate like parts in each of the figures.

Figure 2:
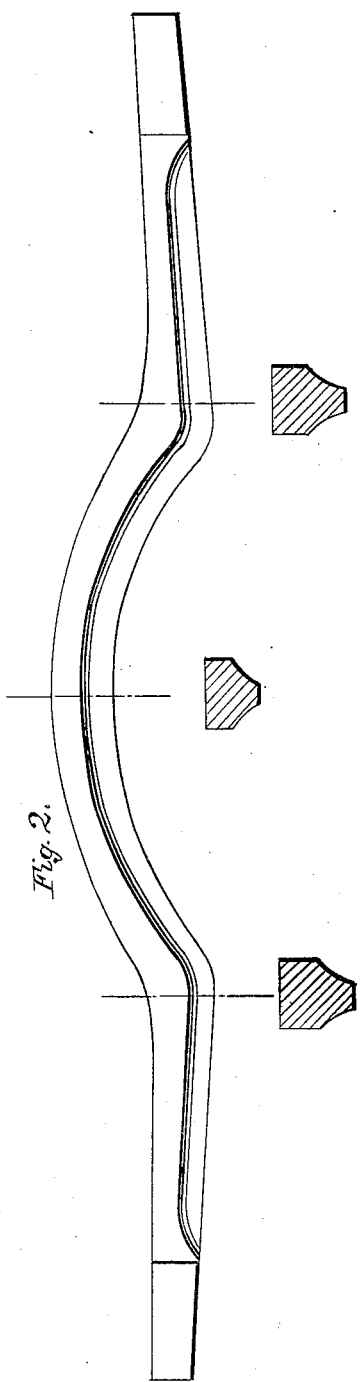
Figure 3:

Figure 1 is a plan or top view. Fig. 2 is an elevation, with sections shown below it. Fig. 3 is a plan showing the reverse of Fig. 1.

My new manufacture of cotton-gin ribs consists in making them reversible, so as to do double service, by chilling them in two places, and constructing the ends so that when one chill is worn out or becomes unfit for further service the rib may be taken off and reversed, so as to wear out the other chill.

My improved ribs for cotton-gins are made of cast-iron, the upper surface (shown in Fig. 1) being chilled in two places, A A, as shown by the broken lines in the drawings. This chilling is effected by placing some pieces of iron in the molds at the points to be chilled, so that when the melted iron is poured into the mold to form the rib it is chilled or cooled very quick, so as to make it very hard and durable at the points on the ribs, where the saws draw or carry the cotton through between the ribs, which retain the seed, so as to effect the separation desired. Each half of my improved rib is made in the same form, with the same curves, and the two ends are of the same size and shape, so that when one of the chills is worn out the planter can take off the rib and reverse the ends and fasten it on again, so as to bring the other chill into service, and thus make the ribs last twice as long and do double the service of those heretofore used. Besides, it saves the planter the trouble and expense of transporting his cotton-gin to some machine-shop and procuring a new set of ribs, which is no easy matter in a sparsely-settled country, like that where the cotton is grown.

My improved rib with two chills costs no more than the ribs heretofore used, while they are worth two set of them. Thus they may be considered to cost the planter only half the price of common ribs.

I am aware that the whole surface of the rib, or the entire space between A and A, might be chilled; but in my opinion they would not be so good, as they would be more likely to break; besides, they would be far more difficult to cast, and it would be far more expensive to finish them than if they were chilled at A A only, as described.

I believe I have described and represented my improvements in manufacturing ribs for cotton-gins, so as to enable any person skilled in the art to make and use them; and I will now state what I desire to secure by Letters Patent, to wit:

The new manufacture of cotton-gin ribs above described—that is to say, ribs of cast-iron with two places chilled upon them in casting, while the rib is so formed that the ends may be reversed in the same breast of the gin, so that when one chilled part of the rib is worn out the other may be brought to the working-point of the gin-saw, and thus effect an important economy in the construction of cotton-gins.

JOHN W. WEBB.

Witnesses:
WM. H. C. PERKINS,
A. J. CRAWFORD.